United States Patent [19]

Falkman et al.

[11] Patent Number: 4,677,430

[45] Date of Patent: Jun. 30, 1987

[54] METHOD AND APPARATUS FOR OPERATING A DISPLAY MONITOR

[75] Inventors: Richard J. Falkman, Winfield; Charles Varvaro, Glen Ellyn, both of Ill.

[73] Assignees: American Telephone and Telegraph Company; AT&T Bell Laboratories, both of Murray Hill, N.J.

[21] Appl. No.: 643,635

[22] Filed: Aug. 23, 1984

[51] Int. Cl.[4] .................................................. G09G 1/16
[52] U.S. Cl. .................................... 340/723; 358/220; 340/726; 340/749
[58] Field of Search ................ 358/220; 340/724, 726, 340/749

[56] References Cited

U.S. PATENT DOCUMENTS

| 3,267,454 | 8/1966 | Schaaf | 340/724 |
| 3,623,005 | 11/1971 | Roberts | 340/726 |
| 3,700,955 | 10/1972 | Lowe | 315/379 |
| 3,793,483 | 2/1974 | Bushnell | 178/69 |
| 4,127,796 | 11/1978 | Henderson | 358/220 |
| 4,130,830 | 12/1978 | Derickson | 358/220 |
| 4,198,661 | 4/1980 | Gatten et al. | 358/242 |
| 4,275,338 | 6/1981 | Grocki et al. | 315/381 |
| 4,297,619 | 10/1981 | Kiteley | 315/381 |
| 4,359,745 | 11/1982 | Reid | 346/23 |
| 4,369,441 | 1/1983 | Wohlmuth | 340/733 |

FOREIGN PATENT DOCUMENTS 2214657 4/1973 Fed. Rep. of Germany .
58-190163 2/1984 Japan .

*Primary Examiner*—Marshall M. Curtis
*Attorney, Agent, or Firm*—Ross T. Watland

[57] ABSTRACT

A method and an apparatus for operating a display monitor to prevent burn-in of the screen. The entire display is imperceptibly moved in both vertical and horizontal directions by changing the temporal relationship between the information signal transmitted to the monitor and the signals used to synchronize the scanning of the screen.

15 Claims, 3 Drawing Figures

METHOD AND APPARATUS FOR OPERATING A DISPLAY MONITOR

TECHNICAL FIELD

This invention relates to systems that display information on a screen, and, more particularly, to systems that prevent the burn-in effect caused by prolonged display of the same image on a cathode ray tube (CRT).

BACKGROUND OF THE INVENTION

To display an image on the face of a CRT, an electron beam is scanned across a phosphorescent coating on the inside of the face in successive horizontal lines which progress from top to bottom. The electron beam intensity is modulated with the information to be displayed so that the phosphorescent coating is caused to glow in a pattern corresponding to the image. In some cases, the image moves, as in television, so that no particular area of the screen is singled out for extended electron beam bombardment. Thus, the electron beam does not land on any given spot for a long enough time to damage the phosphorescent layer. The same is not true, however, when the displayed image is stationary and particularly when it is both stationary and sharply outlined. In such cases, the electron beam is traced repeatedly along the same path across the phosphorescent coated faceplate. The damage that results is what is called "burn-in" and it can leave a permanent and highly undesirable "scar" along wihch the phosphorescent coating is damaged. Consequently, when another image is subsequently sought to be displayed, the outline of the burn-in path may become partially or totally visible.

In one known CRT display anti-burn circuit, a triangular offset voltage waveform is added to each of the normal electron beam deflecting voltages to constantly move the entire electron scan pattern over an infrequently recurring path. The display of stationary images is prevented and the movement of the pattern is sufficiently slow to be imperceptible to the viewer. However, with many commercially available display monitors, e.g., video monitors used in computer terminals, users are not provided access to the deflecting voltages. Furthermore, since the design of the high voltage circuitry used in such monitors varies widely, modifications to monitors provided by different manufacturers would have to be customized. In addition, no means is provided to adapt the characteristics of display movement, e.g., the rate or the extent of the movement, to a particular application.

In view of the foregoing, a recognized problem in the art is the need for a flexible method of operating a display monitor to prevent burn-in without requiring that complex and expensive modifications be made to the monitor itself.

SUMMARY OF THE INVENTION

The aforementioned problem is advantageously solved and a technical advance is achieved in accordance with the principles of the invention in both a method and an apparatus for operating a display monitor to prevent burn-in of the screen wherein the displayed images are imperceptibly moved by changing the temporal relationship between the information signal transmitted to the monitor and the signals used to synchronize the scanning of the screen.

In an illustrative method in accordance with the invention, the synchronizing signal is delayed with respect to the information signal and the delay is sequentially increased from a minimum delay to a maximum delay and sequentially decreased back to the minimum delay over a relatively long period, e.g., 15 minutes.

BRIEF DESCRIPTION OF THE DRAWING

A more complete understanding of the present invention may be obtained from a consideration of the following description when read in conjunction with the drawing in which.

DETAILED DESCRIPTION

Figure 1:
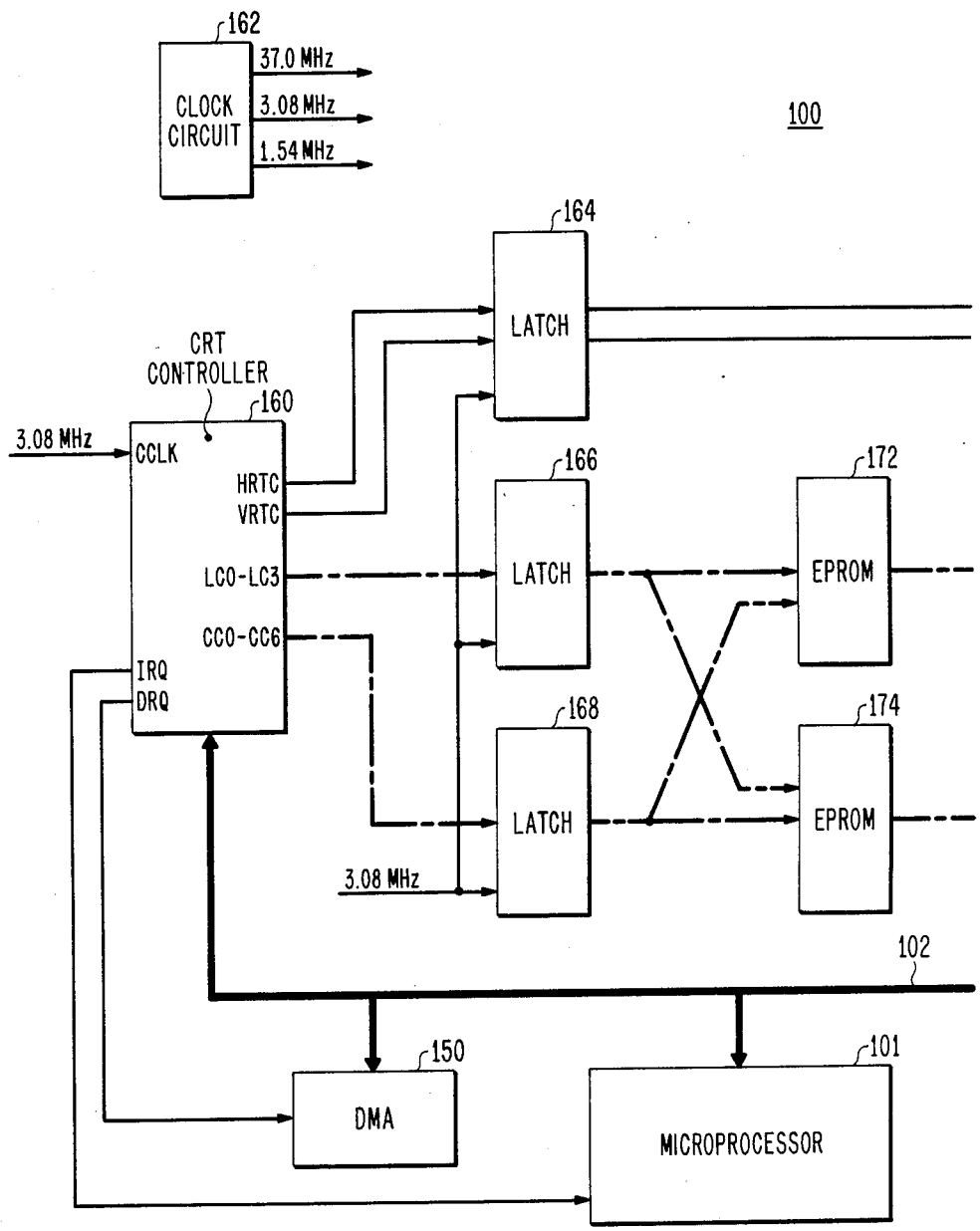
FIGS. 1 and 2, when arranged in accordance with FIG. 3, present a diagram of an exemplary video display system illustrating the principles of the present invention.
Figure 2:
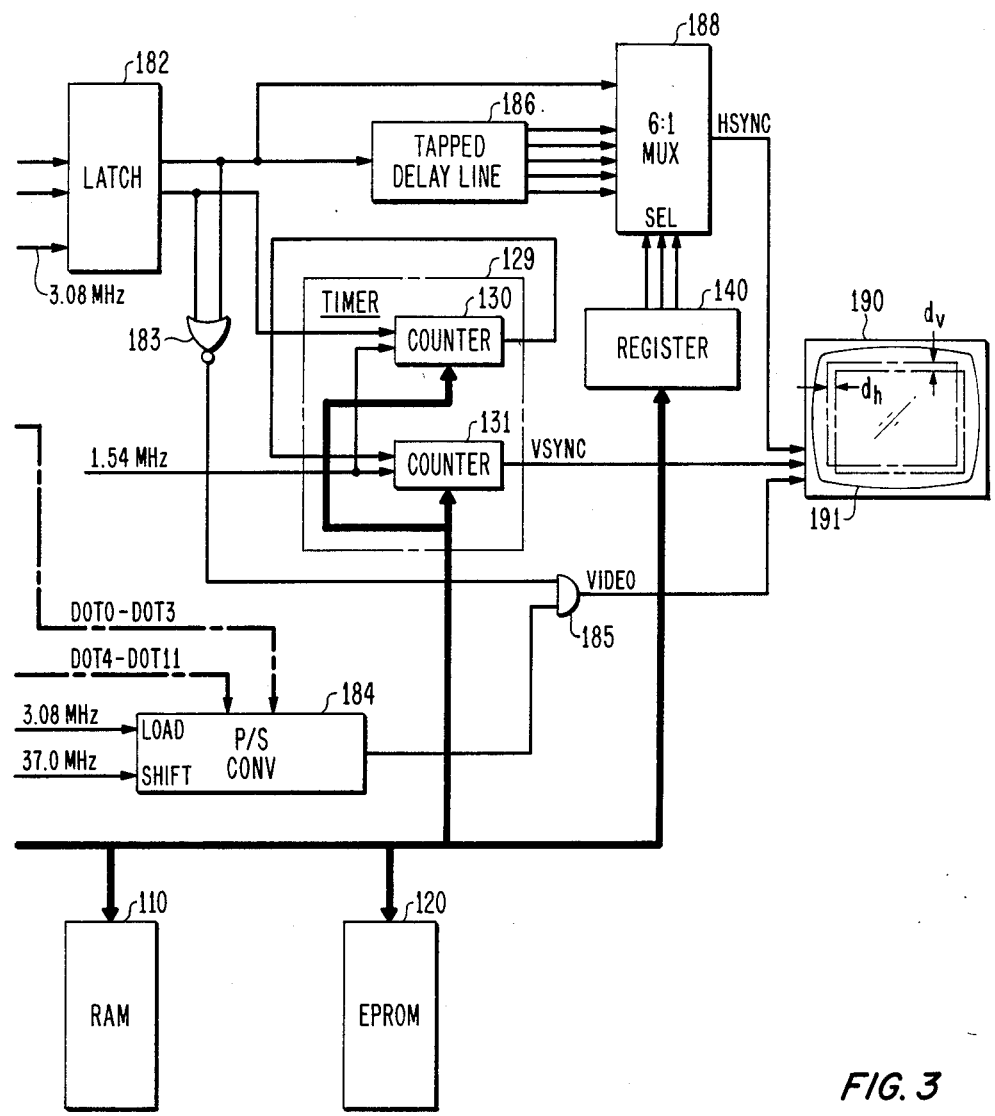
Figure 3:
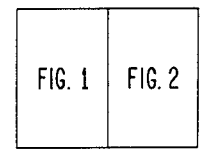

In the exemplary video display system 100 shown in FIGS. 1 and 2, information is displayed on a screen 191 of a display monitor 190, e.g., the Motorola DS4000 monitor. In the exemplary embodiment, screen 191 represents the face of a cathode ray tube. To display an image on screen 191, an electron beam is scanned across a phosphorescent coating on the inside of the tube face in successive horizontal lines which progress from top to bottom. The electron beam intensity is modulated with the information to be displayed so that the phosphorescent coating is caused to glow in a pattern corresponding to the image. In system 100, the information signal is a video signal that, in effect, turns the electron beam on and off at a high rate. As is conventional, the information in the video signal is interspersed between synchronizing pulses to synchronize horizontal and vertical scanning of the cathode ray tube to provide a coherent display. Temporally adjacent portions of the video signal are separated by sufficient time intervals to permit the leftward return of the beam at the end of a line and the upward return of the beam at the end of a frame. After each information portion representing a line on screen 191 is transmitted to monitor 190, a horizontal synchronizing pulse is transmitted to synchronize the horizontal scanning of screen 191. Similarly, after a unit of information comprising a complete frame or page is transmitted, a vertical synchronizing pulse is transmitted to synchronize the vertical scanning of screen 191.

System 100 is operated under the control of a microprocessor 101 which communicates with an erasable programmable read only memory (EPROM) 120, a random access memory (RAM) 110, a CRT controller 160 and a direct memory access (DMA) device 150 over a bus 102. EPROM 120 stores a program which is read and executed by microprocessor 101 to control system operation. RAM 110 stores the information comprising one or more pages of characters that have been entered, for exapmle via a keyboard (not shown), to be displayed by monitor 190. CRT controller 160, e.g., the Intel 8275 controller, controls the conversion of the character information stored by RAM 110, to a video signal defining images to be displayed by monitor 190. CRT controller 160 includes two row buffers (not shown) each of which stores one row of 80 characters. (Each row buffer also stores information defining certain display attributes, e.g., reverse video.) When CRT controller 160 transmits a request signal to DMA 150 from a DRQ terminal, DMA 150 responds by effecting the transmission of one row of characters (as well as associated display attributes) from RAM 110 via bus 102 to be stored in one of the row buffers of CRT controller 160. When CRT controller 160 transmits the next request signal to DMA 150, the next row of characters is transmitted from RAM 110 to the second row buffer of CRT controller 160. During the time that characters are being transmitted to the second row buffer, the characters stored by the first row buffer are being transmitted to monitor 190. After the rows of characters that comprise a complete frame have been transmitted to monitor 190, CRT controller 160 transmits an interrupt signal to microprocessor 101 from an IRQ terminal. Microprocessor 101 responds by reprogramming DMA 150 as necessary to effect the transmission to CRT controller 160 of the rows of characters comprising the next frame of information.

Timing within system 100 is derived from a 74.0-megahertz oscillator (not shown) which is included within a clock circuit 162 that divides the oscillator frequency by 2, 24, and 48 to derive clock signals of 37.0, 3.08, and 1.54 megahertz, respectively. Characters are transmitted from CRT controller 160 in response to the 3.08-megahertz clock signal, which is referred to herein as the character clock signal. The characters transmitted by CRT controller are defined by a seven-bit character code transmitted in parallel from controller terminals CC0 through CC6 to a latch 168. In the present embodiment, each character is 14 lines high. CRT controller 160 transmits a four-bit line code in parallel from its terminals LC0 through LC3 to a latch 166 to define which one of the 14 lines is presently being conveyed to monitor 190. CRT controller 160 transmits each row of characters 14 times, the first time with a line code of 0000, the second time with a line code of 0001, etc. The characters in the present embodiment are 12 dots wide. Both the character code stored in latch 168 and the line code stored in latch 166 are transmitted to two EPROMs 172 and 174 which store the 12 dot definitions for each of the 14 lines of all the defined characters. (EPROM 172 stores the first four dot definitions DOT0 through DOT3 and EPROM stores the remaining eight dot definitions DOT4 through DOT11.) The 12 dot definitions for a given line of a given character as defined by the codes stored in latches 166 and 168, are transmitted in parallel from EPROMs 172 and 174 to a parallel/serial converter 184 and are stored by converter 184 in response to the character clock signal. Converter 184 serially transmits the dot definitions to a first input terminal of an AND gate 184 in response to the 37.0-megahertz clock signal. When a NOR gate 183 is transmitting a logic one enable signal to a second input terminal of AND gate 185, the dot definitions transmitted by converter 184 are conveyed via AND gate 185 as a 37.0-megahertz input video signal to monitor 190.

After the 80 characters of a given line have been transmitted by CRT controller 160, controller 160 transmits a horizontal retrace pulse from its HRTC terminal to a tapped delay line 186, e.g., the Technitrol TTLDL200 delay line, via two latches 164 and 182 which are clocked in response to the character clock signal. Latches 164 and 182 are included to maintain the horizontal retrace pulse in synchronism with the character information, which was first stored in latch 168 and then stored in parallel-serial converter 184. The duration of the horizontal retrace pulse transmitted by CRT controller 160 is that of 16 characters, i.e., approximately 5.4 microseconds. Delay line 186 generates at its five output terminals, versions of the horizontal retrace pulse delayed by 40, 80, 120, 160 and 200 nanoseconds. The five delayed pulses generated by delay line 186, together with the undelayed horizontal retrace pulse, are transmitted as the six input signals to a 6:1 multiplexer 188. A three-bit word, stored in a register 140 by microprocessor 101 via bus 102, is transmitted to multiplexer 188 to define the one of the six input signals of multiplexer 188 to be transmitted as the horizontal synchronizing signal to monitor 190. Therefore, microprocessor 101 can, by writing the appropriate word into register 140, effect the transmission by multiplexer 188 of horizontal synchronizing signals delayed by from 0 to 200 nanoseconds with respect to the information portions of the video signal. The scanning of screen 191 is quickly resynchronized to a delayed synchronizing signal. However, the effect of the delay of the synchronizing signal with respect to the video signal is the same that would obtain if the video signal were advanced in time with respect to the synchronizing signal. Therefore, the delay of the horizontal synchronizing signal results in a leftward, horizontal displacement of the images displayed on screen 191. A maximum horizontal displacement, $d_h$ (FIG. 2), approximately ⅔ the width of one character, is obtained by a 200 nanosecond delay variation.

When CRT controller 160 completes the transmission of the last line of a frame, it transmits a vertical retrace pulse from a VRTC terminal to a pair of series-connected counters 130 and 131 included in a timer 129, e.g., the Intel 8253 timer. As with the horizontal retrace pulse, the vertical retrace pulse is also transmitted via latches 164 and 182 to maintain its synchronism with the character information. The mode of operation of counters 130 and 131 is defined by microprocessor 101 via bus 102. In the present embodiment, counters 130 and 131 both count the pulses of the 1.54-megahertz clock signal up to predetermined numbers that are established by microprocessor 101 via bus 102. The predetermined number established for counter 130 defines the delay of the vertical synchronizing pulse to be transmitted to monitor 190 and the predetermined number established for counter 131 defines the width of that pulse. When counter 130 receives the vertical retrace pulse from latch 182, it counts up to its predetermined number and then transmits a signal to counter 131. In response to the signal from counter 130, counter 131 begins the transmission of the vertical synchronizing pulse to monitor 190 and also begins to count up to the counter 131 predetermined number. The end of the vertical synchronizing pulse is defined when counter 131 reaches its predetermined number. In the present embodiment, the vertical synchronizing pulse width is maintained at approximately 500 microseconds. At system initialization, microprocessor 101 writes via bus 102 the predetermined number to counter 131 to define the specified pulse width. However, microprocessor 101 can vary the pulse delay from 0 to 435 microseconds in 650 nanosecond increments by writing via bus 102 numbers from 0 to 670 to counter 130. Delaying the vertical synchronizing signal results in an upward, vertical displacement of the images displayed on screen 191. A maximum vertical displacement, $d_v$ (FIG. 2), approximately equal to the height of one character is obtained by a 435 microsecond delay variation.

Since the operation of counters 130 and 131 from the 1.54-megahertz clock signal is in synchronism with the character clock signal and therefore with the vertical retrace pulse transmitted by CRT controller 160, a small quantization error, which could otherwise result in variations in the delay of the vertical synchronizing signal and, therefore, in the vertical position of the images displayed on screen 191, is prevented.

The horizontal and vertical retrace pulses transmitted by CRT controller 160 are also conveyed via latches 164 and 182 to two input terminals of NOR gate 183. When CRT controller 160 is transmitting characters to monitor 190 and is transmitting neither a horizontal nor a vertical retrace pulse to NOR gate 183, NOR gate 183 transmits a a logic one enable signal to the second input terminal of AND gate 185 so that AND gate 185 conveys the video signal transmitted by converter 184 to monitor 190. However, when CRT controller 160 has completed the transmission of a line of charcters and is transmitting a horizontal retrace pulse or when CRT controller has completed the transmission of the last line of a frame and is transmitting a vertical retrace pulse, NOR gate 183 transmits a logic zero blanking signal to AND gate 185. The blanking signal disables the transmission of the video signal by AND gate 185 thus assuring that nothing is displayed on screen 191 during the retrace of the beam. By providing blanking in this manner, system 100 assures that the variation of delay of the horizontal and vertical synchronizing signals will not affect the proper blanking of screen 191.

Since the horizontal and vertical movements of the images displayed on screen 191 are determined under the program control of microprocessor 101, the characteristics of the movement can be flexibly adapted to the particular application. For example, to effect horizontal movement in the present embodiment, microprocessor 101 controls via bus 102 and register 140, the selection of successive ones of the input signals of multiplexer 188 to increase the delay of the horizontal synchronizing signal from a minimum delay of zero to a maximum delay of 200 nanoseconds in 40 nanosecond increments. The selection sequence is then reversed to decrease the delay from 200 nanoseconds to zero. One such cycle from zero to 200 nanoseconds back to zero is completed every 15 minutes. To effect vertical movement, microprocessor 101 controls via bus 102 the predetermined count which counter 130 must reach before counter 131 begins the transmission of the vertical synchronizing pulse to monitor 190. By increasing the predetermined count from 0 to 670 in increments of 10, for example, the delay of the vertical synchronizing signal is increased from a minimum delay of zero to a maximum delay of 435 microseconds in increments of 6.5 microseconds. The process is then reversed to decrease the delay from 435 microseconds to zero. In the exemplary embodiment, one such cycle of vertical movement is completed every 17 minutes. By independently controlling the horizontal and vertical movement, the resulting pattern of movement repeats very infrequently. Although in the present embodiment the movements occur at fixed time intervals, the movements could be made in response to repeated operator actions such as page selection or page redraw.

It is to be understood that the above-described embodiment is merely illustrative of the principles of the present invention and that other embodiments may be devised by those skilled in the art without departing from the spirit and scope of the invention. For example, rather than changing the temporal relationship of the information signal and the synchronizing signal by delaying the synchronizing signal, as in the described embodiment, the information signal could instead be delayed.

What is claimed is:

1. A method of operating a monitor that displays information on a screen comprising transmitting an information signal to said monitor representing information to be displayed on said screen, transmitting a synchronizing signal to said monitor to synchronize scanning of said screen, generating digital words each defining a single discrete change in the temporal relationship of said information signal and said synchronizing signal and during the continued transmission of said information and synchronizing signals, responding to each of said generated digital words by effecting the discrete change in the temporal relationship of said information and synchronizing signals defined by said each generated digital word to effect a discrete displacement of the information displayed on said screen to prevent burn-in of said screen.

2. A method in accordance with claim 1 wherein said generating step comprises generating digital words each defining a single discrete delay of said synchronizing signal with respect to said information signal.

3. A method in accordance with claim 2 wherein said step of generating digital words each defining a single discrete delay of said synchronizing signal with respect to said information signal comprises generating one sequence of digital words defining an increasing sequence of discrete delays of said synchronizing signal with respect to said information signal from a minimum delay to a maximum delay.

4. A method in accordance with claim 3 wherein said step of generating digital words each defining a single discrete delay of said synchronizing signal with respect to said information signal further comprises generating another sequence of digital words defining a decreasing sequence of discrete delays of said synchronizing signal with respect to said information signal from said maximum delay to said minimum delay.

5. A method in accordance with claim 4 wherein said step of generating digital words each defining a single discrete delay of said synchronizing signal with respect to said information signal further comprises alternately repeating said generating one sequence step and said generating another sequence step.

6. A mthod in accordance with claim 2 wherein said step of generating digital words each defining a single discrete delay of said synchronizing signal with respect to said information signal comprises generating a sequence of digital words defining a decreasing sequence of discrete delays of said synchronizing signal with respect to said information signal from a maximum delay to a minimum delay.

7. A method of operating a monitor that displays information on a screen to prevent burn-in of said screen comprising transmitting an information signal to said monitor representing information to be displayed on said screen, transmitting a horizontal synchronizing signal to said monitor to synchronize scanning of said screen, transmitting a vertical synchronizing signal to said monitor to synchronize vertical scanning of said screen, generating first digital words each defining a signal discrete change in the temporal relationship of said information signal and said horizontal synchronizing signal, generating second digital words each defining a single discrete change in the temporal relationship of said information signal and said vertical synchronizing signal during the continued transmission of said information and synchronizing signals, responding to each of said generated first digital words by effecting the discrete change in the temporal relationship of said information signal and said horizontal synchronizing signal defined by said each generated first digital word to effect a discrete horizontal displacement of the information displayed on said screen and during the continued transmission of said information and synchronizing signals, responding to each of said generated second digital words by effecting the discrete change in the temporal relationship of said information signal and said vertical synchronizing signal defined by said each generated second digital word to effect a discrete vertical displacement of the information displayed on said screen.

8. Apparatus for operating a monitor that displays information on a screen comprising
means for transmitting an information signal to said monitor representing information to be displayed on said screen,
means for transmitting a synchronizing signal to said monitor to synchronize scanning of said screen,
means for generating digital words each defining a single discrete change in the temporal relationship of said information signal and said synchronizing signal and
means operative during the continued transmission of said information and synchronizing signals and responsive to each of said generated digital words for effecting the discrete change in the temporal relationship of said information and synchronizing signals defined by said each generated digital word to effect a discrete displacement of the information displayed on said screen to prevent burn-in of said screen.

9. Apparatus in accordance with claim 8 wherein said generating means comprises
means for generating digital words each defining a single discrete delay of said synchronizing signal with respect to said information signal.

10. Display apparatus comprising
a monitor having a screen for displaying information thereon,
means for transmitting an information signal to said monitor representing information to be displayed on said screen,
means for generating a blanking signal in fixed temporal relation to said information signal to define time intervals between distinct portions of said information signal, each said portion representing information to be displayed on a separate line on said screen,
means for generating a synchronizing signal by delaying said blanking signal by a variable delay time, where said variable delay time may be zero,
means for transmitting said synchronizing signal to said monitor to synchronize horizontal scanning of said screen to the receipt of said distinct portions of said information signal,
means for generating digital words each defining a single discrete change of said variable delay time,
means operative during the continued transmission of said information and synchronizing signals for responding to each of said generated digital words by effecting the discrete change of said variable delay time defined by said each generated digital word to effect horizontal movement of the information displayed on said screen to prevent burn-in of said screen and
means responsive to said blanking signal for disabling the transmission of said information signal by said information signal transmitting means during said time intervals.

11. Display apparatus in accordance with claim 10 wherein said means for generating a synchronizing signal comprises
means for generating at least one delayed version of said blanking signal and
selection means for generating said synchronizing signal by selecting one signal from the plurality of signals comprising said blanking signal and said at least one delayed version of said blanking signal,
and wherein said responding means comprises means for changing the selection made by said selection means in response to said each generated digital word.

12. Display apparatus in accordance with claim 10 wherein said means for generating a synchronizing signal comprises
means for generating a plurality of delayed versions of said blanking signal and
selection means for generating said synchronizing signal by selecting one signal from said plurality of delayed versions of said blanking signal,
and wherein said responding means comprises means for changing the selection made by said selection means in response to said each generated digital word.

13. Display apparatus comprising
a monitor having a screen for displaying information thereon,
means for transmitting an information signal to said monitor representing information to be displayed on said screen,
means for generating a blanking signal in fixed temporal relation to said information signal to define time intervals between distinct units of said information signal, each said unit representing information to be displayed on a separate frame on said screen,
means for generating a synchronizing signal by delaying said blanking signal by a variable delay time, where said variable delay time may be zero,
means for transmitting said synchronizing signal to said monitor to synchronize vertical scanning of said screen to the receipt of said distinct units of said information signal,
means for generating digital words each defining a single discrete change of said variable delay time,
means operative during the continued transmission of said information and synchronizing signals for responding to each of said generated digital words by effecting the discrete change of said variable delay time defined by said each generated digital word to effect vertical movement of the information displayed on said screen to prevent burn-in of said screen and means responsive to said blanking signal for disabling the transmission of said information signal by said information signal transmitting means during said time intervals.

14. Display apparatus in accordance with claim 13 wherein said means for generating a synchronizing signal comprises means for generating a clock signal and counter means responsive to said blanking signal for initiating counting of transitions of said clock signal and for generating said synchronizing signal upon reaching a predeterined count and wherein said responding means comprises means for changing the predetermined count to be reached by said counter means in response to said each generated digital word.

15. Apparatus for operating a monitor that displays information on a screen comprising controller means for transmitting coded characters, a horizontal retrace signal defining time intervals between lines of said coded characters, and a vertical retrace signal defining time intervals between frames of said lines, conversion means responsive to said coded characters transmitted by said controller means for converting said coded characters to a video information signal representing said coded characters, said converting resulting in a substantially fixed time delay of said video information signal with respect to said coded characters transmitted by said controller means, means for transmitting said video information signal to said monitor, means for delaying said horizontal and vertical retrace signals by said substantially fixed time delay, means responsive to said delayed horizontal and vertical retrace signals for disabling the transmission of said video information signal by said means for transmitting said video information signal, delay line means for generating at least one delayed version of said delayed horizontal retrace signal, selector means for generating a horizontal synchronizing signal by selecting one signal from the plurality of signals comprising said delayed horizontal retrace signal and said at least one delayed version of said delayed horizontal retrace signal, means for transmitting said generated horizontal synchronizing signal to said monitor to synchronize horizontal scanning of said screen, means for generating a clock signal, counter means responsive to said delayed vertical retrace signal for initiating counting of transitions of said clock signal and for generating a vertical synchronizing signal upon reaching a predetermined count, means for transmitting said generated vertical synchronizing signal to said monitor to synchronize vertical scanning of said screen, memory means for storing coded characters to be displayed on said screen and program instructions and processor means for executing said program instructions to effect the transfer of coded characters from said memory means to said controller means and for repetitively changing the selection made by said selector means and the predetermined count to be reached by said counter means to prevent burn-in of said screen by effecting incremental horizontal and vertical displacement of the information displayed on said screen.

* * * * *